United States Patent

Babaian et al.

[11] Patent Number: 5,889,985
[45] Date of Patent: Mar. 30, 1999

[54] ARRAY PREFETCH APPARATUS AND METHOD

[75] Inventors: Boris A. Babaian; Valeri G. Gorokhov; Feodor A. Gruzdov; Yuli Kh. Sakhin; Vladimir Yu. Volkonski, all of Moscow, Russian Federation

[73] Assignee: Elbrus International, George Town, Cayman Islands

[21] Appl. No.: 733,831

[22] Filed: Oct. 18, 1996

Related U.S. Application Data

[63] Continuation of PCT/RU96/00217, Aug. 7, 1996.
[51] Int. Cl.$^6$ ..................................................... G06F 9/00
[52] U.S. Cl. ............................................................ 395/566
[58] Field of Search ..................... 364/DIG. 1 MS File, 364/DIG. 2 MS File; 395/800.01, 800.04, 800.05, 800.06, 800.07, 800.08, 376, 381, 383, 561, 562, 563, 564, 566, 701, 702, 705, 706–709

[56] References Cited

U.S. PATENT DOCUMENTS 4,128,880  12/1978  Cray, Jr. ............................. 395/800.04
5,201,058  4/1993  Kinoshita et al. .................. 395/800.06

*Primary Examiner*—Robert B. Harrell
*Attorney, Agent, or Firm*—Pennie & Edmonds LLP

[57] ABSTRACT

An array prefetch system improves processor performance by automatically tuning a statically compiled and compacted loop program at run-time to accommodate variations in latency of memory read operations. Using the array prefetch system, the processor, while awaiting completion of a data access, continues to generate requests for subsequent iterations rather than fully halting execution until a read access is finished.

20 Claims, 9 Drawing Sheets

| PI | clc | ecnt | cldovl | tptr | hptr | cins | hins | apb_ready |
|---|---|---|---|---|---|---|---|---|
| 1 | 4 | 1 | 0 | 0<br>1<br>2<br>3 | 0<br>0<br>0<br>0 | 0<br>1<br>2<br>3 | 0<br>0<br>0<br>0 | 0<br>0<br>0<br>0 |
| 2 | 3 | 1 | 1 | 4<br>5<br>6<br>7 | 0<br>0<br>0<br>0 | 0<br>1<br>2<br>3 | 0<br>0<br>0<br>0 | 0<br>0<br>0<br>0 |
| 3 | 2 | 1 | 2 | 8<br>9<br>10<br>11 | 0<br>1<br>2<br>3 | 0<br>1<br>2<br>3 | 0<br>1<br>2<br>3 | 1<br>1<br>1<br>1 |
| 4 | 1 | 1 | 2 | 12<br>13<br>14<br>15 | 4<br>5<br>6<br>7 | 0<br>1<br>2<br>3 | 0<br>1<br>2<br>3 | 1<br>1<br>1<br>1 |
| 5 | 0 | 1 | 2 | 16<br>17<br>18<br>19 | 8<br>9<br>9<br>9 | 0<br>1<br>2<br>3 | 0<br>1<br>1<br>1 | 1<br>0<br>0<br>0 |
| 6 | 0 | 0 | 3 | 20<br>20<br>20<br>20 | 9<br>9<br>10<br>11 | 0<br>1<br>2<br>3 | 1<br>1<br>2<br>3 | 0<br>1<br>1<br>1 |
| 7 | 0 | 0 | 2 | 20<br>20<br>20<br>20 | 12<br>13<br>14<br>15 | 0<br>1<br>2<br>3 | 0<br>1<br>2<br>3 | 1<br>1<br>1<br>1 |
| 8 | 0 | 0 | 1 | 20<br>20<br>20<br>20 | 16<br>17<br>18<br>19 | 0<br>1<br>2<br>3 | 0<br>1<br>2<br>3 | 1<br>1<br>1<br>1 |

FIG. 8A

| | LOGICAL ITERATIONS | | | | MEMORY DATA |
|---|---|---|---|---|---|
| 0 | 1 | 2 | 3 | | |
| APLDa0→APB[0]<br>APLDb0→APB[1]<br>-<br>- | | | | | |
| -<br>-<br>-<br>- | APLDa1→APB[4]<br>APLDb1→APB[5]<br>-<br>- | | | | APB[0]=a0 |
| APMVa0<br>APMVb0<br>FMUL<br>- | -<br>-<br>-<br>- | APLDa2→APB[8]<br>APLDb2→APB[9]<br>-<br>- | | | APB[1]=b0<br>APB[4]=a1 |
| -<br>-<br>-<br>STOREc0 | APMVa1<br>APMVb1<br>FMUL<br>- | -<br>-<br>-<br>- | APLDa3→APB[12]<br>APLDb3→APB[13]<br>-<br>- | APB[5]=b1<br>APB[8]=a2 |
| | -<br>-<br>-<br>- | APMVa2<br>-<br>-<br>- | -<br>-<br>-<br>- | APB[12]=a3<br>APB[9]=b2 |
| | -<br>-<br>-<br>STOREc1 | APMVb2<br>FMUL<br>-<br>- | -<br>-<br>-<br>- | APB[13]=b3 |
| | | -<br>-<br>-<br>STOREc2 | APMVa3<br>APMVb3<br>FMUL<br>- | |
| | | | -<br>-<br>-<br>STORE c3 | |

FIG 8B

ARRAY PREFETCH APPARATUS AND METHOD

The present application is a continuation of a PCT international application designating the United States of America (Ser. No. PCT/RU96/00217) filed Aug. 7, 1996, naming Babaian et al. as inventors and entitled "ARRAY PREFETCH APPARATUS AND METHOD".

BACKGROUND OF THE INVENTION

1. Field of the Invention

The present invention relates to processors and computing devices. More specifically the present invention relates to a method and apparatus in a processor for prefetching data in arrays.

2. Description of the Related Art

A data prefetch cache is typically used to prefetch large amounts of data having little or no temporal locality without disturbing a conventional first level data cache. The data prefetch cache is thus used for masking load latencies. In many applications such as scientific computation, data prefetch is used to iterate over the elements of a large array with little re-use of accessed elements. The data prefetch is used in these applications to avoid thrashing since, if a first-level cache were used, accessed elements may replace other data that is re-used such as scalar variables in a loop. If such re-used data is replaced in the first-level cache, other data items are repeatedly loaded. The data prefetch is used to avoid thrashing since array elements are prefetched to a data prefetch cache and then loaded from this cache so that the first-level cache is not corrupted by little-used data. Typically, the data prefetch cache is a fully associative cache which is much smaller than the first-level cache. The size of the data prefetch cache is determined by the total number of load operations that can be active at one time.

A conventional data prefetch cache has several disadvantages. One disadvantage of a software-controlled prefetch technique is that an additional prefetch code typically must be inserted either before a loop body or during a loop body, thereby increasing the run-time software burden of the code.

Another disadvantage of a software-controlled prefetch technique is that the number of software execution cycles between a prefetching operation and an operation that uses the data read during the prefetching operation is strictly and statically defined by the code structure while the memory access latency of a data access is variable. If the memory latency exceeds the software execution time, the processor stalls. The strict static definition of code structure is inherently disadvantageous since the code structure cannot adjust to variations in dynamic latencies in accesses of memory. Performance of the processor may suffer due to an increase in processor stalls while the processor awaits a transfer of data from memory. The effect of stalls on processor performance is magnified for operation of software pipelined loops due to accumulations of timing delays.

The aforementioned problem of thrashing is raised, in which the replacement of useful data in the data prefetch cache is possible.

A further disadvantage is that, for a dedicated prefetch buffer, a complicated associative structure is commonly needed.

SUMMARY OF THE INVENTION

In accordance with the present invention, an array prefetch system improves processor performance by automatically tuning a statically compiled and compacted loop program at run-time to accommodate variations in latency of memory read operations. Using the array prefetch system, the processor, while awaiting completion of a data access, continues to generate requests for subsequent iterations rather than fully halting execution until the read access is finished.

Also in accordance with the present invention, an array prefetch apparatus and technique uses a buffer to dynamically adjust timing of a statically compiled loop instruction code to statically unknown latencies of memory read operations. The array prefetch apparatus and technique are applied to software pipelined loops under constraints that memory read operations such as loads are located in the first stage of a logical iteration and operations with side-effects such as memory write operations or stores, loop breaks and the like are located in the last stage of a logical iteration.

Also in accordance with the present invention, an array prefetch apparatus and technique operate within a software pipelined loop concept using a plurality of stages (S) to execute a compiled, overlapped loop schedule of T cycles having an iteration interval (I), where $S=T/I$. The number of stages in an iteration is dynamically controlled during run-time as a function of the latencies of memory read operations. In particular, the number of stages is determined by monitoring the T cycles as an indication of the latencies of memory read operations and dividing the monitored cycles by the iteration interval I. The loop schedule of T cycles and the number of stages are naturally dynamic values. A compiler pipelines, packs and stores an instruction code for execution on a processor based on statically known operation latencies. During run-time, the array prefetch apparatus generates additional stages according to the actual latencies of memory accesses. The decoding and execution of memory read operations typically loses synchrony with other operations of a program. In particular, during a frame of one iteration, several superfluous stages are run between the issue of a memory read operation and accessing and processing of data that is read.

In accordance with one embodiment of the present invention, an array prefetch apparatus includes an array prefetch control circuit, an array prefetch queue which is controlled using an array prefetch queue head pointer and an array prefetch queue tail pointer. The array prefetch apparatus further includes an array prefetch flag which is set or reset to respectively activate or deactivate the array prefetch apparatus. Usage of the array prefetch flag advantageously obviates a need for dedicated array prefetch operations. When the array prefetch flag is set, the processor interprets a load (LD) operation as two independent operations, an array prefetch load (APLD) for loading array prefetch queue and an array prefetch move (APMV) operation for moving data from the array prefetch queue to a specified working register.

Many advantages are achieved using the described array prefetch technique and apparatus. One advantage is that the technique and apparatus use only standard operations of the instruction set. The technique is applied without defining and decoding an additional dedicated prefetch operation. A similar advantage is that no additional prefetch operations are inserted either preceding or during the execution of a loop body code. It is advantageous that prefetch memory accesses are controlled inside a loop body program so that only necessary prefetch requests are made and the prefetch requests are made in the correct order. Another advantage is that the prefetch operation is asynchronous and independent relative to performance of the processor. Accordingly, if data are not ready for processing, the array prefetch apparatus does not stall the processor but rather efficiently continues to prefetch data for subsequent iterations. The described array prefetch apparatus and method are further advantageous by simplicity in implementation.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 8 is a timing diagram showing the timing of array prefetch data transfers under control of the array prefetch circuit.

DETAILED DESCRIPTION OF THE PREFERRED EMBODIMENTS

Figure 1:
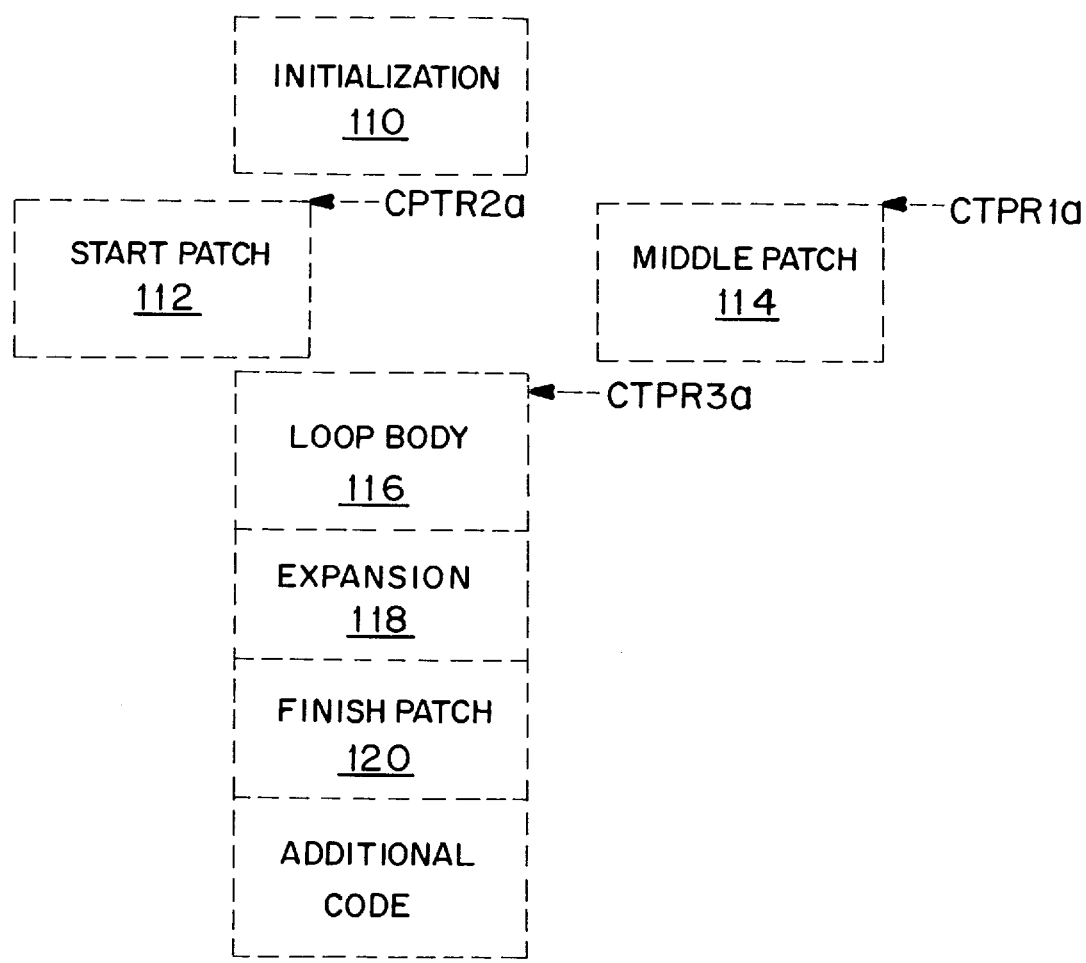
FIG. 1 is a pictorial illustration of a code structure for loop processing which is suitable for implementing an array prefetch system in accordance with an embodiment of the present invention.

Referring to FIG. 1, a code structure for loop processing is strictly defined and includes an initialization fragment 110, a StartPatch fragment 112, a MiddlePatch fragment 114, a LoopBody fragment 116, an Extension fragment 118, and a FinishPatch fragment 120.

The Initialization fragment 110 loads loop control registers and base registers, prepares for control transfer operations, sets initial values for usage in the LoopBody fragment 116, and sets initial values for calculations made in a loop which is an outer loop with respect to the current loop, if any such outer loop is defined. The LoopBody fragment 116 includes physical iteration code for performing a repeating sequence of loop operations. The StartPatch fragment 112 is invoked for implementing nested loops and performs operations including initiation of inner loops, reloading a current address register (CAR) which defines a memory read address, and performing enveloping loop calculations. The FinishPatch fragment 120 is also invoked only for implementing nested loops and performs operations including saving the results of inner loops after execution, determining whether an enveloping loop is complete, reloading the current address register (CAR) which defines a memory write address, and sometimes performing enveloping loop calculations.

The Extension fragment 118 is invoked for implementing nested loops with vector invariants. In particular, the Extension fragment 118 is used to furnish a variable value which is constant within an inner loop but modified in an outer loop. A problem arises due to overlapping of the inner loops during epilogue and prologue periods (which are discussed hereinafter) of adjacent inner loops. Additional servicing to supply the correct variable values to the particular inner loops increases the size and processing time within a repeated loop, possibly reducing the performance of the processor when performing the looping functions. The Extension fragment 118 is used to collect the servicing operations and perform the servicing operations outside the loop body. The presence of an Extension loop 118 is indicated by a mask in the control registers.

The MiddlePatch fragment 114 is invoked for implementing nested loops with the array prefetch buffer (APB). An array prefetch circuit, which is discussed in detail hereinafter, inserts additional timing stages into a logical iteration timing scheme. In particular, the logical iteration has two portions including a dynamic portion and a static portion. In the dynamic portion, load operations are performed and the processor waits for memory data to be retrieved from memory with varying delays arising from memory access latency. In the static portion, all statically compiled stages are performed including operations other than load operations. In the processing of the StartPatch fragment 112, assuming the array prefetch circuit is disabled, procedures include reloading of loop control registers, reloading of read address registers, a portion of the outer loop, and initializing of recurrent and invariant variables. The procedures of reloading the loop control registers and read address registers are performed during the load stages of adjacent inner loops, the StartPatch fragment 112. The procedures of the outer loop and initialization of recurrent and invariant variables are performed only between the first stage of the static portions of the adjacent inner loops because data is processed only during the static portions. The MiddlePatch fragment 114 occurs between the first static stages of the adjacent inner loops.

The fragments StartPatch 112, MiddlePatch 114, Extension 118, and FinishPatch 120 are optional. All array prefetch operations are executed during the MiddlePatch fragment 114.

The static compilation of independent operations into organized and compacted VLIW instructions for execution by a VLIW processor has a substantial inherent disadvantage in that the compiler cannot take into consideration variations in dynamic latencies in accesses of memory. The compiler organizes the operations to a compact form according to various assumptions concerning the execution time of each memory reference. If these assumptions are incorrect in practice, performance of the processor may suffer due to an increase in processor stalls while the processor awaits a transfer of data from memory. The effect of stalls on processor performance is particularly critical in the case of the execution of program loops because the timing delays in repetitive loops accumulate.

Figure 2:
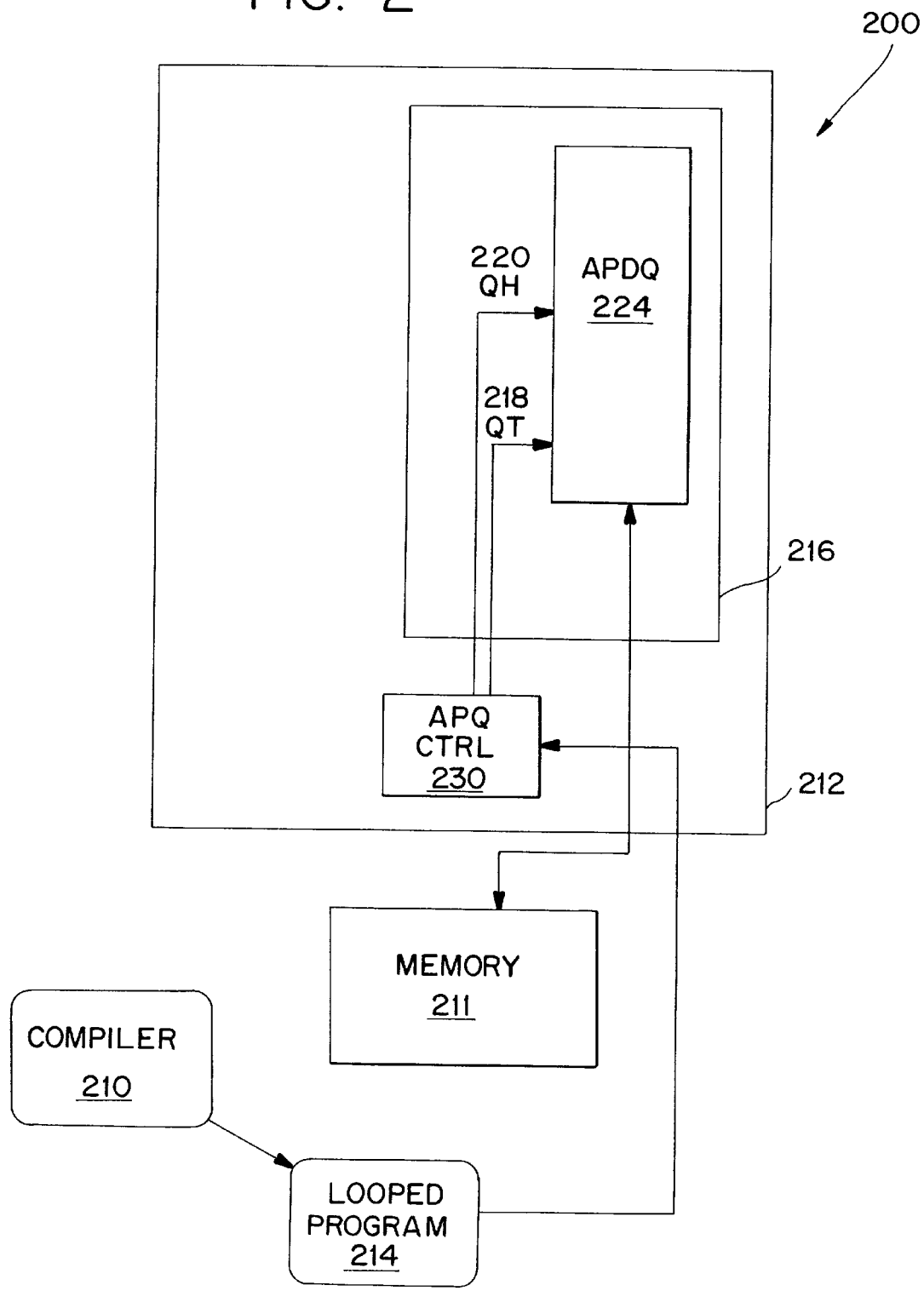
FIG. 2 is a schematic block diagram illustrating an array prefetch system in accordance with an embodiment of the present invention.

Referring to FIG. 2, a schematic block diagram illustrates an array prefetch system 200 which improves processor performance by automatically tuning a statically compiled and compacted loop program at run-time to accommodate variations in latency of memory read operations. Using the array prefetch system 200, the processor, while awaiting completion of a data access, continues to generate requests for subsequent interactions rather than fully halting execution until the read access is finished.

The array prefetch system 200 is based on a concept of overlapped software pipelined loops which is described in greater detail in a copending United States patent application entitled, "Architectural Support for Software Pipelining of Loops", Ser. No. XX/xxx,xxx<atty. docket no.: M-3730 US>, naming Babaian et al as inventors and the corresponding PCT international application designating the United States of America (Ser. No. PCT/RU96/00213); and copending United States patent application entitled, "Architectural Support for Software Pipelining of Nested Loops," Ser. No. XX/xxx,xxx<atty. docket no.: M-3794 US>, naming Babaian et al. as inventors and the corresponding PCT international application designating the United States of America (Ser. No. PCT/RU96/00216), both of which are filed on even date herewith, the detailed description of which is hereby incorporated by reference. In terms of the overlapped software pipelined loop concept, the array prefetch system 200 achieves an improvement in processor performance by regulating the degree of loop overlap automatically depending on the actual delays of memory read operations. The degree of loop overlap is defined as the number of stages needed to execute one logic iteration. The degree of loop overlap may be illustrated graphically as a logic iteration graph height, in time, divided by a stage size in instruction clock cycles. The graph height includes the time of memory read operation latencies. The graph height and, consequently, the degree of overlap are dynamic values. The array prefetch system 200 includes a compiler 210, and array prefetch hardware 212. The compiler 210 compiles, compacts and overlaps a looped program 214 on the basis of statically-known operation execution times. The execution time of memory read operations is typically considered to be known, constant and Generally equal to one clock cycle in duration. The compiler 210 sets various parameters and attributes that are known or predictable at compilation time. Such attributes include a decrement loop counter, a number of overlaps, a maximum load overlap, a number of auxiliary iterations, a control bit enabling and disabling the array prefetch buffer, a side effects manual control, a loop loads manual control. The set attributes further include initial addresses and sizes of rotatable areas of memory.

The array prefetch hardware 212 increases the degree of overlap dynamically to accommodate the actual memory latencies by separating the execution and decoding of memory read operations from other program operations. Thus the array prefetch hardware 212 makes the timing of the execution and decoding of memory read operations independent from the timing of other program operations.

In particular, the array prefetch system 200 causes several excess timing stages to be run between the beginning of read operations and a program code that processes the values read by the read operations within a single logic iteration of the loop. The number of excess stages is determined by the actual delay or latency of the memory read operation. As the excess timing stages are inserted, the array prefetch hardware 212 enforces the correct data dependency.

The timing diagram of a loop resulting from the operation of the array prefetch system 200 is superficially similar to the timing diagram of a overlapped software pipelined loop with the number of overlaps being equal to (n+m), where n is an initial static degree of overlap and m is the number of additional stages defined by the read operation latency divided by the stage size. The array prefetch system 200 adapts to variations in memory read latency by anticipating a memory read operation and storing the read data in an array prefetch buffer 216 in a transaction termed an "array element prefetch".

The execution times of different memory read operations may vary. The array prefetch buffer 216 is a first-in-first-out (FIFO) queue for temporarily storing the prefetched array elements. When an array prefetch begins, a position in an array prefetch queue tail 218 is reserved, and the number of this position is associated to a memory request as a destination attribute (for example, as shown in FIG. 6A). Data is read from memory and placed in the array prefetch buffer 216 at the position designated by a destination attribute as shown in FIG. 6B. Data which are ready for processing are read from the array prefetch buffer 216 at the position of the array prefetch queue head 220 shown in FIG. 6C. One position in the array prefetch buffer 216 corresponds to one wide instruction and the number of cells for storing data in this position corresponds to the number of logical memory access channels in the processor.

Figure 3:
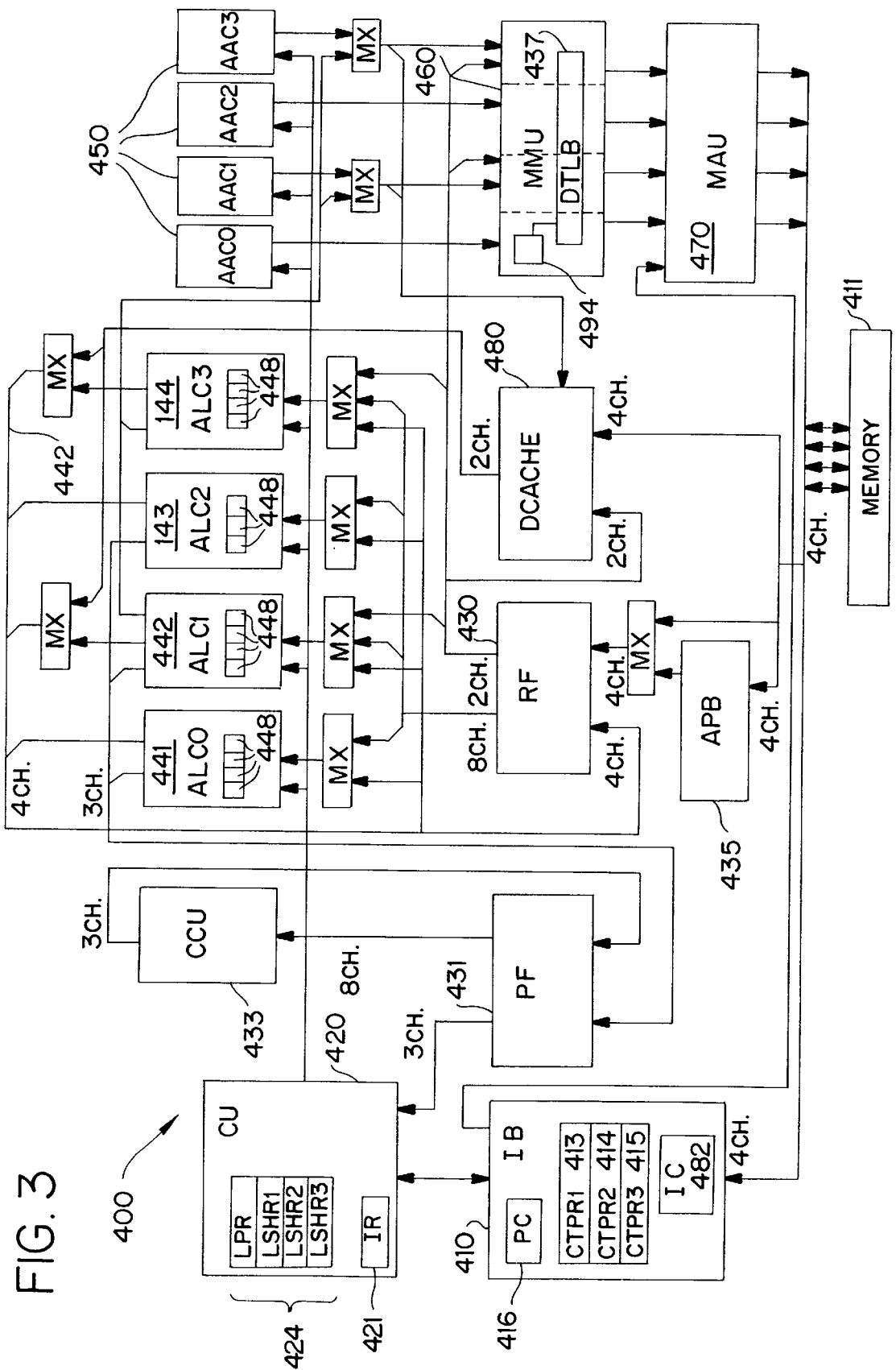
FIG. 3 is a schematic block diagram showing a central processing unit (CPU) which includes an array prefetch system in accordance with an embodiment of the present invention.

Referring to FIG. 3, a Central Processor Unit (CPU) 400 has a wide instruction word architecture and uses Instruction Level Parallelism (ILP) to ensure high performance. The CPU compiler is used to plan the operations to be executed by the CPU 400 in each cycle. The processor structure allows concurrent execution of a few simple independent instructions (operations) that constitute a wide instruction (load, store, add, multiply, divide, shift, logical, branch, etc.). Wide instructions are stored in a memory 411 connected to the CPU 400 in packed form as sets of 16 and 32 bits syllables. Particular operations can occupy a part of syllable, a whole syllable or several syllables. The EU 450 operation execution time is one cycle for integer and logic operations, two cycles for floating point addition, three or four cycles for floating point multiplication, seven cycles for word format division and ten to eleven cycles for two-word format, normalized operands. All operations except division may be run in every cycle. Division may be run every other cycle.

The Central Processor Unit 400 contains an Instruction Buffer (IB) 410, a Control Unit (CU) 420, a multiport Predicate File (PF) 431, a multiport Register File (RF) 430, a Calculate Condition Unit (CCU) 433, a Data Cache (DCACHE) 480, four Arithmetic Logic Units (ALU0–ALU3) generally identified as 440, each of which includes a plurality of execution units (EUs) which are shown generally as EU 450, an Array Prefetch Buffer (APB) 435, four Array Access Channels (AAC0–AAC3) generally identified as 460, a Memory Management Unit (MMU) 490, and Memory Access Unit (MAU) 470. The combination of wide instruction operation and a large number of execution units 450 allows several alternative program branches to execute concurrently in a speculative mode.

The Instruction Buffer (IB) 410 fetches wide instructions from memory 411 and includes an instruction buffer memory, an instruction alignment logic, a program counter register (PC) 416, and control transfer preparation registers (CTPRI 413 and CTPR2 414), a control transfer execution register (CTER 415), and the instruction cache (ICACHE) 482. The instruction buffer memory is filled in response to both linear program path prefetches and control transfer preparation instructions. The Instruction Buffer (IB) 410 contains 2048 64-bit words and is divided into sixteen sectors. Program code is stored in virtual memory (not shown) which is common with data code storage. IB 410 has a separate Instruction Translate Lookaside Buffer (ITLB) 417 with 32 entries. IB 410 filling is initiated by hardware for direct way when direct way code is exhausted in IB 410 and by a program when prepare control transfer operation is executed. IB 410 performs program code filling for three branches. In the case of IB 410 miss, the program code is loaded from memory 411 by four memory access channels in parallel (four 64-bit words simultaneously). IB 410 and Control Unit (CU) 420 perform reading from IB 410 and dispatching of the maximum size wide instruction (eight 64-bit words) every cycle.

The control unit (CU) 420 generates wide instructions in an unpacked form, transforms indirect based operands addresses of wide instruction to absolute addresses in a register file 430, checks the conditions of the wide instruction issue. The wide instruction issue conditions which are checked include checking for no exceptions, no interlock conditions from other units of CPU 400, and availability of operands in the register file (RF) 430.

The Control Unit (CU) 420 issues wide instruction operations for execution and performs several tasks including reading of up to ten operands from the register file (RF) 430 to ALU0–ALU3 440, reading up to three predicate values from the Predicate File (PF) 431 to Control Unit (CU) 420 as condition code for control transfer operations, reading up to eight predicate values from the Predicate File (PF) 431 to the Calculate Condition Unit (CCU) 433 for calculation of new predicate values and generation of a mask of condition execution of operations in ALU0–ALU3 440 and AAC0–AAC3 460, issuing literal values to ALU0–ALU3 440 and AAC0 AAC3 460, issuing up to four operations to ALU0–ALU3 440, issuing up to four operations to AAC0–AAC3 460, and issuing up to four operations to the Calculate Condition Unit (CCU) 433. The Control Unit (CU) 420 also issues a prepare control transfer operation to Control Unit (CU) 420 and checks for the possibility of the execution of three control transfer operations in Control Unit (CU) 420. The control unit 420 receives an "H-syllable" of an instruction word, transforms operand addresses from the instruction that are base-relative into effective register file addresses, and checks conditions of the next instruction delivery from an unpacked instruction register (not shown) to an execution unit 450. The control unit 420 also executes control transfer operations (CTOPs) and includes loop parameter and status registers 124 such as a loop parameters register (LPR), and loop state registers (LSRI and LSR2).

The Predicate File (PF) 431 is a storage of predicate values generated by integer and floating point compare operations. Predicate values are used to control the conditional execution of operations. The Predicate File (PF) 431 contains 32 two-bit registers.

The Calculate Condition Unit (CCU) 433 generates a mask for the conditional execution of ALUi 440 and AACi 460 operations and calculates values of the secondary predicate as the primary predicates function.

The Register File (RF) 430 contains 256 66-bit registers and has ten read ports and eight write ports. All ten read ports are used to read ALU 440 operands and two read ports are used to read stored values to the Data Cache (DCACHE) 480 and the Memory Management Unit (MMU) 490. Four write ports are used to write ALUs results and the other four write ports are used to write values loaded from memory. The register file 430 accesses the 256 66-bit registers using four address bases (CWP, CWPAR, BR1 and BR2). Each base addresses up to 64 registers.

ALU0–ALU3 440 are four parallel executive channels and have nearly the same sets of arithmetic and logic operations. ALU1 and ALU3 are used to calculate addresses of scalar memory accesses, All ALUs receive operands from register file (RF) 430 and bypass buses 442. The bypass abates the time of delivery of ALUs operations results to the following operations. ALU0 and ALU2 receive two operands and ALU1 and ALU3 receive three operands for execution of combined three-argument operations. ALU 440 operation results are written to the register file (RF) 430 through four RF write channels.

The Array Access Channels AAC0–AAC3 460 are four parallel channels for generation of array elements addresses for loops. Each AACi contains eight pair of address registers which are current address register and increment register. All AACi 460 have the same operations set including a current array element address generation operation with or without the next element address calculation. For memory accesses, one pair of address registers in each channel is used in every cycle. AAC0 and AAC2 are used only for load memory accesses. AAC1 and AAC3 are used for load and store memory accesses.

The Memory Management Unit (MMU) 490 contains a four-port Data Translate Lookaside Buffer (DTLB) 437 with 64 entries and performs hardware search in Page Table in DTLB 437 miss case. The Memory Management Unit (MMU) 490 also contains a Disambiguation Memory 494 for checking rearrangement correctness of load and store operations, performed by an optimizing compiler.

The MAU 470 is an interface for communicating between the CPU 400 and external memory at an exchange rate of up to four information words transferred during a cycle. The Memory Access Unit contains an entry buffer for memory requests and a crossbar of four data and one group instruction buffer (IB) 410 memory access channels to four physical memory channels. Two least significant bits of physical addresses are the physical memory channel number.

The Data Cache (DCACHE) 480 caches data for scalar memory access. Data Cache (DCACHE) 480 is write-through, 32 Kbytes, four-way set associative with 64-byte blocks, virtually addressed and virtually tagged, dual-ported with 64-bit data paths. Data Cache (DCACHE) 480 output is united with ALUs output that permits to use bypass buses 442 to abate data transfer to ALUs. In the case of DCACHE miss data from memory are transferred to Data Cache (DCACHE) 480 through four channels simultaneously.

The Array Prefetch Buffer (APB) 435 is used to prefetch array elements for loops from memory. The Array Prefetch Buffer (APB) 435 is a four-channel FIFO buffer. The Array Prefetch Buffer (APB) 435 is a barrel memory used for implementing an array prefetch queue. The size of the Array Prefetch Buffer (APB) 435 is 48 positions, and thus contains 4×48 66-bit registers. One position contains cells for four doublewords in accordance with the number of logic memory access channels. The cells are numbered from 0 to 3, corresponding in number to the numbers of the logic memory access channels. Each APB cell has a valid bit for determining the availability of filled data. The valid bit array is denoted APBV. Data are transferred from the Array Prefetch Buffer (APB) 435 to the register file (RF) 430 when the data are ready.

The CPU 400 has four memory access channels. Each channel has 64 bits data path.

Figure 4:
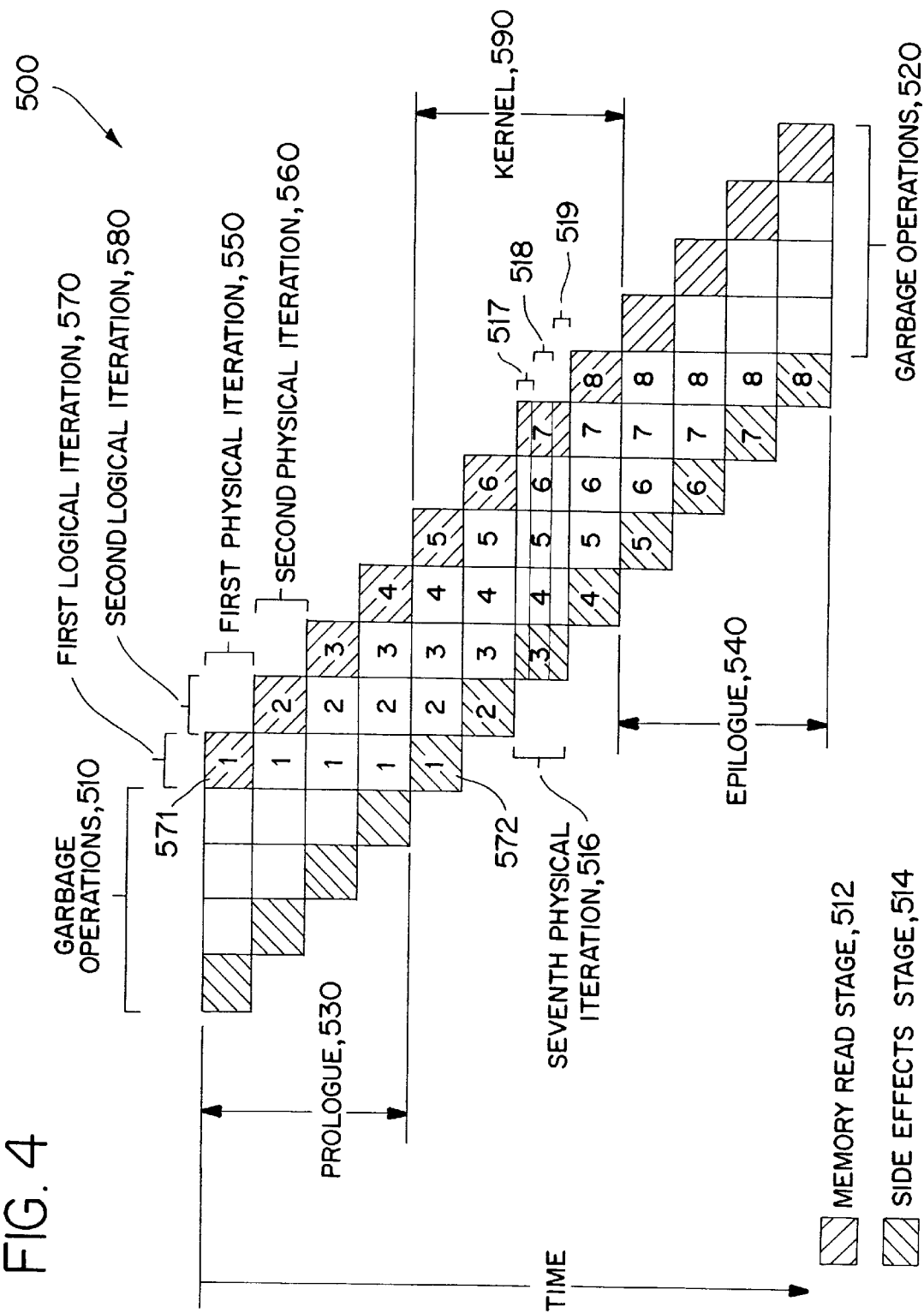
FIG. 4 is a pictorial illustration of loop scheduling of a simple inner loop in accordance with the teachings of the present invention.

The processor 400 achieves parallel execution of operations using a software pipelined loop concept operating in a plurality of stages (S) to execute a compiled, overlapped loop schedule of T cycles having an iteration interval (I), where S=T/I. Referring to FIG. 4, showing a loop execution diagram, during the first I cycles a first stage of a first iteration executes. During the next I cycles, the first stage of a second iteration and the second stage of the first iteration execute. The loop progresses in this manner until S different iterations are executing in different stages. The first S-1 iterations of a loop, when less than all stages are executing, is called a prologue interval 530. During the final S iterations, the final stages of final iterations are executing while early iterations of early cycles have terminated so that not all stages are executing. The final S-1 iterations of a loop, when all stages are not executing, is called an epilogue interval 540. The intermediate iterations, when all stages are executing concurrently, are called a kernel interval 590.

A compiler (not shown) for generating instruction code for a VLIW processor acts upon loop code for overlapped execution by overlapping portions of the instruction code corresponding to several sequential iterations of a loop. Operations from several iterations are combined, or overlapped, into a single wide instruction word. VLIW compilers, which are well known in the computing arts, implement variations of a software pipelining technique.

Two types of iterations are distinguished, specifically logical iterations and physical iterations. Logical iterations are iterations within an original loop code before the code is compiled. Physical iterations are run-time iterations of a software pipelined loop. Multiple logical iterations are overlapped in a physical iteration. In overlapped loop code, the number of overlapped logical iterations in a physical iteration is $N_{OVL}$. $N_{OVL}$ physical iterations are executed to complete a logical iteration so that one logical iteration is executed in $N_{OVL}$ stages. For an initial loop code having $N_{LI}$ logical iterations, the overlapped and pipelined loop has $N_{PI}=N_{LI}+(N_{OVL}-1)$ physical iterations. Referring to FIG. 4, a timing diagram shows iterations of a simple inner loop compiled for execution on CPU 400. Logical iterations including a first logical iteration 570 and a second logical iteration 580 and physical iterations including a first physical iteration 550 and a second physical iteration 560 are illustrated. Five logical iterations are overlapped in each physical iteration and each logical iteration is executed in five stages.

During execution of a kernel portion 590 of the loop body, operations from respective stages of five logical iterations are executed at executive units of CPU 400. For example, during the seventh physical iteration 516, stages of logical iterations 3, 4, 5,6, and 7 are executed. A single physical iteration can require the evaluation of more than one instruction word, i.e., "n" very long instruction words evaluated in "n" cycles such as 517, 518, and 519. However, not every very long instruction required for a physical iteration will contribute an operation to the set of operations evaluated for a stage of a logical iteration, i.e., some cycles will not contribute an operation to some stages. Unlike the physical iterations of kernel portion 590, physical iterations of prologue 530 and epilogue 540 portions of the body of a simple inner loop do not include a full set of stages. In particular, during prologue portion 530, the first NOVL-1 physical iterations of loop body 500, certain stages include garbage operations 510 which are associated with non-existent logical iterations. Similarly, during epilogue portion 540, the last NOVL-1 physical iterations of loop body 500, garbage operations 520 are associated with other non-existent logical iterations.

In each case, the garbage operations 510 and 520 occur because each physical iteration of loop body 500 includes the same set of operations, encoded by the one or more VLIW instruction cycles which make up a physical iteration. However, despite the full set of operations encoded for a physical iteration of loop body code, only one valid stage exists in the first physical iteration 550, only two valid stages exist in the second physical iteration 560, etc., until all five stages are valid in the initial physical iteration of kernel portion 590, for example physical iteration NOVL. Garbage operations 510 are the invalid operations. Garbage operations 520 are similar, but result from increasing numbers of stages containing invalid operations during the epilogue portion 540 of loop body 500.

The prologue/epilogue control technique implemented by control logic of CPU 400 selectively enables and disables the execution of categories of operations, rather than providing prologue/epilogue control by exploiting predicated execution codings to successively enable additional stages during successive physical iterations of the prologue and to successively disable stages during successive physical iterations of the epilogue. Although the prologue/epilogue control technique is not a general solution for all inner loop body code, the technique can be applied to a large class of loop programs.

The loop body code for performing prologue/epilogue conforms to two reasonable constraints on the structure of the pipelined logical iterations. First, memory read operations such as loads are confined to the first stage of a logical iteration. Second, operations with side-effects such as memory write operations or stores, loop breaks and the like are confined to the last stage of a logical iteration. These constraints are imposed by the compiler. The restriction of memory read operations to memory read stages 512 and of operations having side-effects to side-effects stages 514 is illustrative of the loop body code constraints. In particular, memory read operations associated with logical iteration 570 are constrained to the first stage 571 of the logical iteration. Similarly, side-effects operations associated with logical iteration 570 are constrained to the last stage 572 of the logical iteration.

These constraints are not generally burdensome for typical program code and a majority of loops in known benchmark applications are compatible with the constraints and advantageously exploit a specialized loop control logic described hereinafter. For loops that do not comply with these constraints the loop control logic is disabled and the compiler furnishes predicated execution encodings to maintain prologue/epilogue control.

Figure 5:
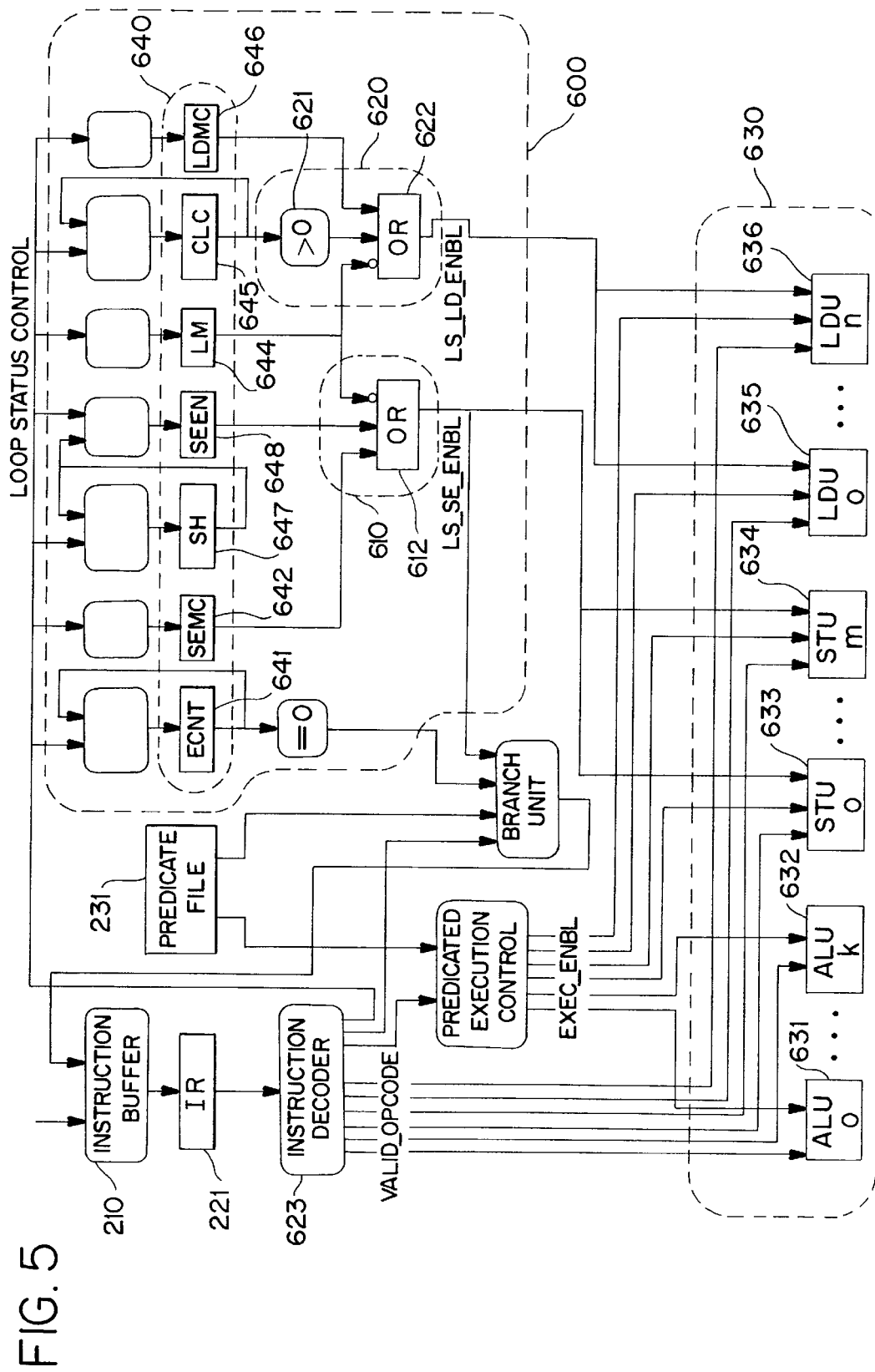
FIG. 5 is a block diagram of loop control logic constructed in accordance with the teachings of the present invention.

Referring to FIG. 5, a schematic block diagram illustrates prologue and epilogue control logic including loop control registers of CPU 400. Loop control logic 600 is connected to receive values for loop control variables from VLIW instruction decoder 623. These values are used to initialize fields of various loop parameters and loop control registers which are collectively shown as loop parameter and status registers 640. In particular, these values initialize an epilogue counter field (ecnt) 641, a shift register (sh) 647, a side-effects enabled flag (seen) 648, a current loop counter field (cic) 645, a loop mode flag (im) 644, and side-effects manual control (semc) and loads manual control (1dmc) flags (642 and 646). Side-effects enabling logic 610 and load enabling logic 620 respectively issue the side-effects enabled predicate (ls_se_enbl) and the loads enabled predicate (ls_ld_enbl) to respective subsets of execution units illustratively grouped as 630.

$STU_0$ 633 through $SYU_m$ 634 are illustrative of executive units which implement operations with side-effects and which are distributed among ALU1 442 and ALU3 444 as described above with reference to FIG. 3. $STU_0$ 633 through $STU_m$ 634 are also illustrative of the AAC1 and AAC3 channels of AAC 460. $STU_0$ 633 through $STU_m$ 634 are each responsive to the ls_se_enbl predicate, enabling side-effects operations when ls_se_enbl is asserted and disabling side-effects operations when ls_se_enbl is de-asserted.

$LDU_0$ 635 through $LDU_n$ 636 are similarly illustrative of executive units which implement load operations and which are distributed among ALU1 442 and ALC3 444 as described above with reference to FIG. 3. LDU₀ 635 through LDU$_n$ 636 are also illustrative of array access channels (AAC0, AAC1, AAC2, and AAC3) 460. LDU₀ 635 through LDU$_n$ 636 are each responsive to the ls__ld__enbl predicate, enabling load operations when ls__ld__enbl is asserted and disabling load operations when ls__ld__enbl is de-asserted.

ALU₀ 631 through ALU$_k$ 632 are illustrative of executive units which implement arithmetic and logic operations, including non-load and non-side-effects operations, and which are distributed among ALU0 441, ALU1 442, ALU2 443, and ALU3 444. as described above with reference to FIG. 3. The operation of ALU₀ 631 through ALU$_k$ 632 is unaffected by the state of either the ls__se__enbl predicate or the ls__ld__enbl predicate.

Side-effects enabling logic 610 and load enabling logic 620 are depicted unctionally in FIG. 5. Side-effects enabling logic 610 implements the following redicate:

ls__se__enbl=!lm ||seen ||semc;

while load enabling logic 620 implements:

ls__ld__enbl=!lm ||(clc>0)||ldmc;

Side-effects enabling logic 610 and load enabling logic 620 may be implemented using various other known circuits. For example, although the embodiment is shown with comparison logic, including a less than zero comparison logic 621, and OR gates such as OR gates 612 and 622), side-effects enabling logic 610 and load enabling logic 620 may be implemented in positive or negative logic, using AND, OR, NAND, or NOR gates. Suitable transformations of the respective logic equations are well known. Additionally, the initialization and transition sequencing of register fields may be alternately defined with suitable modifications to the logic equations. Similarly, many suitable designs for comparing register values to trigger values are known. Side-effects enabling logic 610 and load enabling logic 620 are of any such suitable designs.

Figure 6:
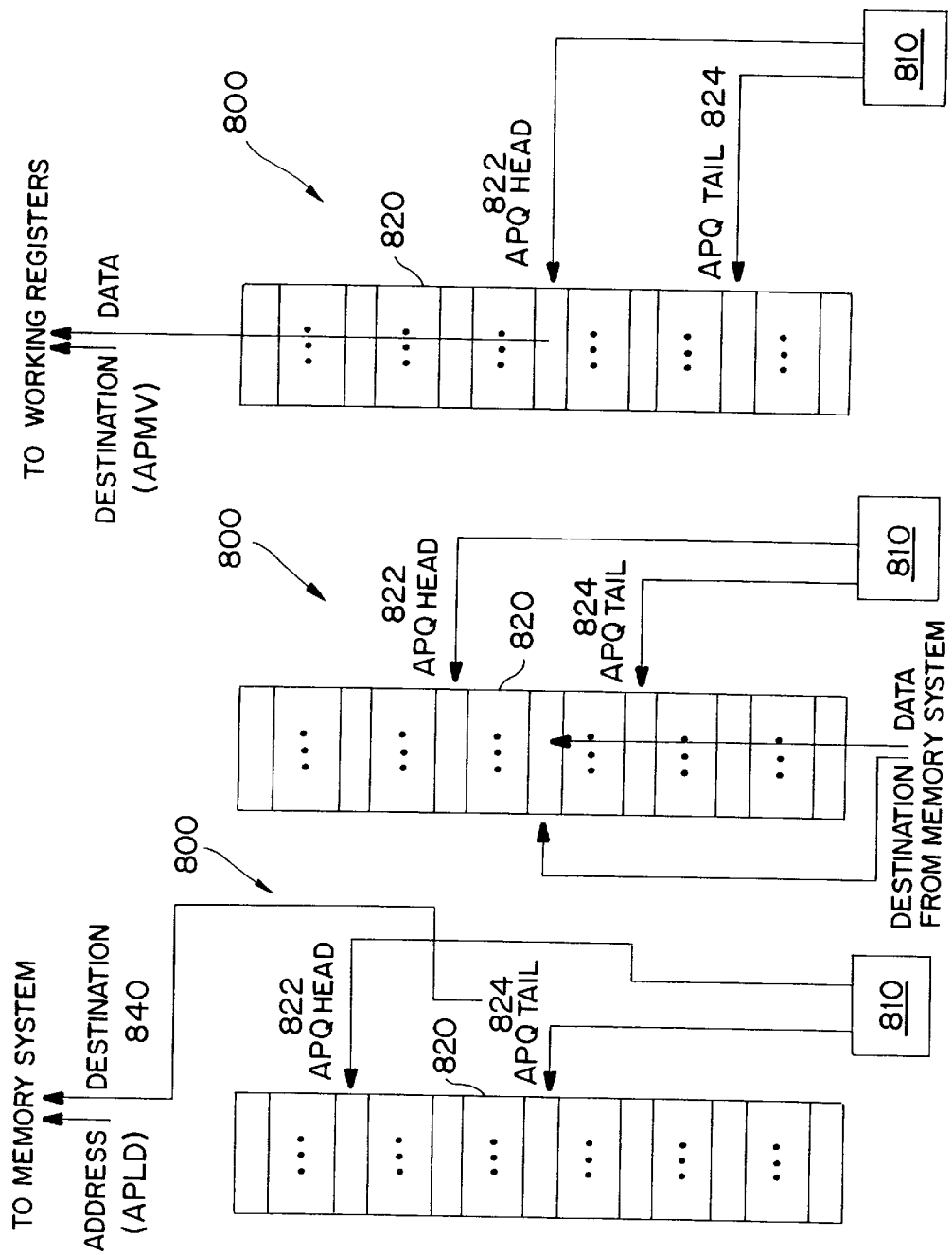
FIGS. 6(A) 6(B), and 6(C) are pictorial illustrations showing data handling in an array prefetch apparatus.

The operation of loop control logic 600 includes three types of operations and with reference to FIGS. 5 and 6. The operation types include operations that cause side-effects including store and loop-break operations, load operations including load address modifications and arithmetic logic type operations.

For loop body code compiled in accordance with the predefined constraints, operations with side-effects are restricted to the last stage of a logical iteration and load operations are restricted to the first stage of a logical iteration. For example, in FIG. 4 side-effects operations of the first logical iteration 570 are scheduled for stage 5 572 for the fifth physical iteration of loop body 500. Load operations of the first logical iteration 570 are scheduled for stage 1 571 for the first physical iteration 550 of a loop body 500. Arithmetic and logic operations may be scheduled in any of the 5 stages of a logical iteration, shown as $N_{OVL}=5$ in the illustration of FIG. 4. Arithmetic and logic operations of the first logical iteration 570 are scheduled for any of the stages from stage 1 571 to stage 5 572 for any of the first five physical iteration of a loop body 500.

Referring again to FIG. 4, the first four ($N_{OVL}-1$) physical iterations in the prologue portion 530 of loop body 500 include stages having operations collectively shown as garbage operations 510. Loop control logic 600 disables garbage operations of the prologue portion 530 of loop body 500 by de-asserting the side-effects enabled predicate supplied to side-effect execution units 633 through 634. Arithmetic and logic operations are included in the set of garbage operations 510 and evaluations of arithmetic and logic operations of the ALU channels 631 and 632 are unaffected by the side-effects enabled predicate. Since these garbage arithmetic and logic operations are not part of any valid logical iteration, they operate on uninitialized data and produce unpredictable garbage-type result values. However, since these garbage result values are used only inside a logical iteration boundary and since operations with side-effects are disabled by the side-effects enabled predicate, the garbage result values do not propagate.

Referring to FIG. 5, side-effects enabling logic 610 supplies the side-effects enabled predicate, disables side-effects operations during the prologue portion of a loop, and otherwise enables side-effects operations. The side-effects enable flag (seen) 648 enables and disables the side-effects enabling logic. For example, the side-effects enabling logic 610 disables operations with side-effects during the first four physical iterations while side-effects enable flag (seen) 648 is reset. On the fifth physical iteration and thereafter, operations with side-effects are enabled and remain enabled for the remainder of the inner loop.

The last four ($N_{OVL}-1$) physical iterations of a loop body 500, which make up the epilogue portion 540, include stages having operations collectively shown as garbage operations 520. Loop control logic 600 disables these garbage operations of the epilogue portion 540 of loop body 500 by de-asserting the loads enabled predicate supplied to load execution units 635 through 636. The arithmetic and logic operations are also included in the set of garbage operations 510 and the evaluation of the arithmetic and logic operations at ALU channels 631 and 632 are unaffected by the loads enabled predicate. Since the arithmetic and logic operations are not part of a valid logical iteration, the operations operate on uninitialized data and produce unpredictable garbage result values. The garbage result values are used only inside a logical iteration boundary. Loop body code restricts operations having side-effects to the last stage of a logical iteration. Since garbage operations 520 include no operations with side-effects, garbage result values do not propagate.

Load enabling logic 620 supplies the loads enabled predicate, disables load operations during the epilogue portion of a loop, and otherwise enables load operations. The loop counter register 645 and the epilogue counter register 641, are used by the load enabling logic 620 to distinguish the epilogue portion of a loop. A loop initialization operation loads loop counter register 645 with a value equal to the number of logical iterations, $N_{LI}$, and loads epilogue counter register 641 with a value equal to the $N_{OVL}-1$. Loop counter register 645 is decremented at the end of each physical iteration until the loop counter reaches zero. When the loop counter is one, the first stage of the last logical iteration begins, illustratively shown as logical iteration 8 in FIG. 4. An loop counter value of zero (0) indicates the beginning of the epilogue period, when operations of the load class are disabled. To implement the loop schedule shown in FIG. 4, loop counter register 645 is initialized with the value 8, the loop mode flag 644 is set, and the manual control flag 646 is cleared. Load enabling logic 620 enables load operations during the first eight physical iterations, while loop counter register 645 contains a non-zero value. Upon the ninth physical iteration and thereafter, load operations are disabled and remain disabled for the remainder of the inner loop. Epilogue counter register 641 is decremented at the end of each physical iteration of the epilogue until the value in the epilogue counter register 645 reaches zero, signaling termination of a simple inner loop.

Arithmetic and logic operations which are included in either the garbage operations 510 of prologue period 530 or the garbage operations 520 of epilogue period 540 occasionally produce garbage exception conditions. For example, garbage arithmetic and logical operations in the prologue portion 530 of loop body 500 occasionally operate on uninitialized operand values and trigger an exception condition. Garbage arithmetic and logical operations are an artifact of the software pipelining model rather than valid operations so that exception conditions or traps which result are superfluous. The problem of garbage exceptions is addressed by deferring the handling of an exception until the last stage of a logical iteration, when an iteration, and thus an exception occurring during the iteration, is known to be superfluous. Using the technique of speculative execution, several branches are executed while a condition is being resolved. The exception handing problem of a software pipelined loop is similar, using overlapping and execution of several logical iterations simultaneously while some of them are invalid and their results should be ignored.

Speculative execution in the VLIW processor 400 proceeds as each operand is tagged with a diagnostic bit (db). Data paths, register files and functional units in processor 400 support the diagnostic bit. When a speculatively executing operation issues an exception, the operation marks the result as a diagnostic value. The marking is set, for example, in the register file 430 as a diagnostic value. The actual exception handling event or trap is deferred. The diagnostic value typically contains information about the operations and the triggering exception. If a subsequent speculatively-executed operation uses a marked value as an input operand, the diagnostic bit tagging is passed through to the result, propagating the exception along the speculatively executed execution path and deferring the exception or trap. If the execution path, such as a branch or garbage operations in a loop, is not taken, all results and exceptions are extinguished. Otherwise the execution path is taken since the loop operations are not garbage operations and the execution path results and exception conditions are eventually passed to operations which are executed non-speculatively. The tagged diagnostic operand causes an exception and trap when the input operand is used in a non-speculatively executed operation. In pipelined loops, all operations of a logical iteration, except iterations having side-effects, are executed speculatively. Operations with side-effects are executed non-speculatively so that all kinds of side-effects, including exceptions and traps, are deferred until the last stage of a logical iteration. Side-effects associated with exceptions and traps are therefore controlled by the loop status registers.

Figure 7:
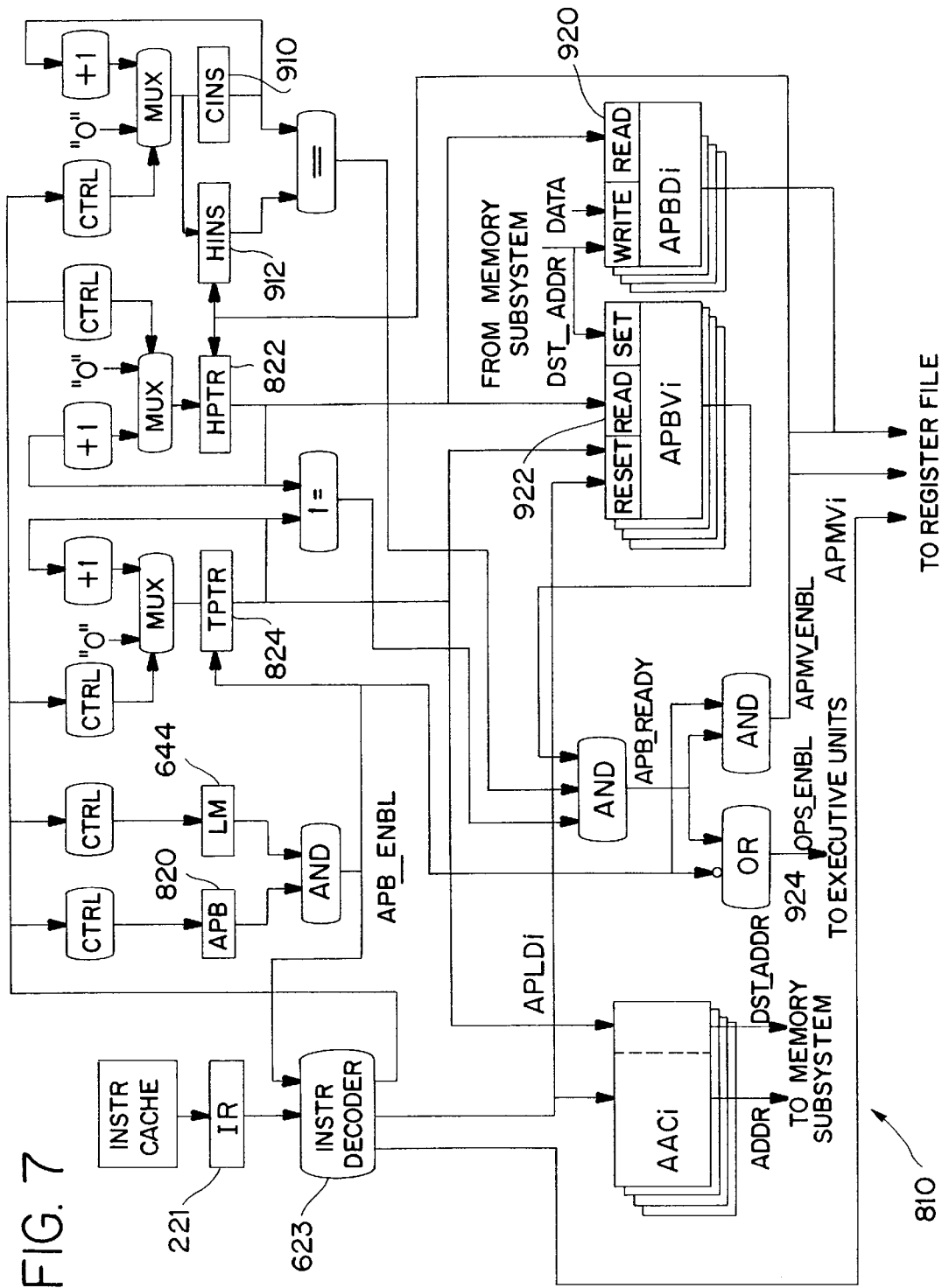
FIG. 7 is a schematic block diagram which illustrates control elements within an array prefetch circuit.

Referring to FIGS. 6(A) through 6(C) in combination with FIG. 7, a pictorial illustration shows a method of data handling by an array prefetch circuit 800. The array prefetch circuit 800 includes an array prefetch control circuit 810, an array prefetch queue 820 which is organized as a first-in-first-out queue and is controlled using an array prefetch queue head pointer (APQH) 822 and an array prefetch queue tail pointer (APQT) 824. The array prefetch circuit 800 further includes an array prefetch flag 830 which is set or reset to respectively activate or deactivate the array prefetch circuit 810. When the array prefetch flag is set, the processor 400 interprets a loop load (LDD) operation as two independent operations, an array prefetch load (APLD) for loading array prefetch queue and an array prefetch move (APMV) operation for moving data from the array prefetch queue to a specified working register. The APLD operation inherits all attributes of a loop load (LLD) operation that concern issuing of a memory request and advancing of a memory address. The memory request information includes addressing information, formatting information and the like. Data loaded using the APLD operation is stored in the array prefetch queue 820 at a location designated by the array prefetch queue tail pointer (APQT) 824. The APMV operation inherits all attributes of a loop load (LLD) operation that concern loading of a destination register by a read data element. The APMV operation moves data from a location in the array prefetch queue 820 which is designated by the array prefetch queue head pointer (APQH) 822 to a working register designated by the APMV operation. The APLD operation and the APMV operation are treated as independent operations and executed in different stages of an iteration.

Referring to FIG. 6(A), during the issue of an array prefetch load (APLD) memory access, a position in the array prefetch queue 820 is reserved and designated by the APQT 824. The APQT 824 is assigned to a request as a destination attribute 840 and the APQT 824 is advanced to the next position in the array prefetch queue 820. Referring to FIG. 6(B), data is transferred from memory to the array prefetch queue 820 in the position designated by the destination attribute 840. Referring to FIG. 6(C), transferred data, which are ready for processing, are transferred from the array prefetch queue 820 located in a position designated by the APQH 822 to working registers identified by the APMV operation. Following the transfer of data to the working registers, the APQH 822 is advanced to a next position in the array prefetch queue 820.

Referring to FIG. 7, a schematic block diagram illustrates array prefetch control elements in various circuits including an array prefetch control circuit 810 and the instruction register (IR) 221 which accesses several storage elements via the instruction decoder 623. The storage elements include the array prefetch flag (apb) 830, the loop mode flag (lm) 644, the APQ tail pointer(tptr) 824, the APQ head pointer (hptr) 822, a current instruction number register (cins) 910, an APQ head instruction number register (hins) 912, an array prefetch queue (APQ) data memory (APBDi) 920, and an APQ valid bit memory (APBVi) 922. The array prefetch flag (apb) 830 is a flag which is controlled to designate whether the array prefetch operation is activated or deactivated.

The loop mode flag (lm) 644 is a flag which indicates the execution of a loop body code. The loop mode flag (lm) 644 is modified by a special loop control transfer (LCT) operation. The loop mode flag (lm) 644 is set when entering a loop body and reset upon exiting of the loop body.

The current instruction number register (cins) 910 is reset by the LCT operation and counts the number of instructions in the loop body since the most recent reset. The APQ head instruction number register (hins) 912 holds the number of the instruction in a frame of a loop body which corresponds to the APQ head (hptr 822). The APQ head may be held or released on an instruction basis, rather than a per stage basis. The APQ position is used for any loop body instruction, even loop body instructions that do not contain loads, so that control of the pointers is facilitated without decreasing efficiency. The depth of the array prefetch queue (APQ) data memory (APBDi) 920 is chosen based on the average memory latencies so that data is read into the array prefetch buffer and moved to working registers before the AQP tail pointer (tptr) 824 completely encloses the APQ data memory (APBDi) 920.

The APQ valid bit memory (APBVi) 922 is a storage for holding valid bits, where the notation i expresses the AAU channel number. The APQ data memory (APBDi) 920 and the APQ valid bit memory (APBVi) 922 combine to form an array prefetch queue (APQ) channel, which is closely associated with a particular AAU channel.

In the illustrative multiple-channel memory system, the APQ data memory (APBDi) 920 and the APQ valid bit memory (APBVi) 922 have a number of write ports that matches the number of channels.

An array prefetch procedure for inserting additional stages into a logical iteration includes two types of operations in the LoopBody fragment of a software loop. The two types of operations are load-type operations and processing-type operations. The load-type operations include load operations, load operations with addresses advancing, and operations that advance a loop counter. The processor-type operations include all operations other than load operations.

In addition to the loop predicates, such as the side-effects enabled predicate, which are used for handling the epilogue and prologue intervals of a loop, an additional loop predicate called an operations-enable predicate is defined. The operations-enable predicate 924 enables and disables processing-type operations when the array prefetch procedure is active. An operation stage is defined as idle if processing-type operations within the stage are disabled. During the idle stage, no operations other than array prefetching are performed which are useful to a logical iteration. Note that array prefetching is useful for subsequent iterations. Referring to FIG. 8, first and second stages of a zeroth (0th) logical iteration are idle. The operations-enable predicate value is based upon the availability of read data in the Array Prefetch Buffer (APB), which is designated by an array prefetch buffer ready (APB_ready) predicate. The APB_ready predicate is based upon ready bits within the Array Prefetch Buffer (APB). Referring to FIG. 7, when an APLDi operation is decoded, a cell in the APB Array Prefetch Buffer (APBDi[tptr]) is allocated as a destination register and the valid bit APBVi[tptr] is reset. In all channels j, when no APLD operation is decoded, a valid bit APBVj[tptr] is set, indicating that the addressed cell in the array prefetch buffer is set without waiting. The cell APBVi is set as follows:

if (APLDi)
   then
      APBVi=0;
   else
      APBVi=1.

When data from memory is available to the array prefetch buffer, the valid bit of the destination register is set to 1.

The array prefetch queue head is checked for data availability according to the following logic equation:

$$apb\_ready = (hptr\ !=tptr)\&\&$$
$$APBV0[hptr]\&\&APBV1[hptr]\&\& \ldots \&\&$$
$$(hins == cins).$$

In the logic equation, the first line indicates that the array prefetch queue (APQ) is active. The second line indicates that the array prefetch queue head (APQH) is not waiting, either because all requested data are already read or no data is requested. The third line indicates that the instruction in the APQ head is in synchrony with the current decoded instruction of a loop body. Note that a position in the array prefetch queue (APQ) corresponds to a particular instruction in the loop body. If the array prefetch queue head (APQH) is not ready, the APQH does not advance until an instruction in the same position of the next stage becomes available because the APLD operation and the APMV operation operate as a coupled pair. Thus, the APMV data is read only by the APLD operation located in the same instruction in the loop body.

Once the APQ head corresponding to the Nth instruction of a loop body is not ready, specifically data for the APMV instruction is not available, then the Nth and remaining instruction of the physical iteration become idle. The idle status of the remaining instructions is appropriate since the operations in the iteration operate only on the data supplied by the APMV operation. Similarly, the zeroth (0th) through (N-1)th instructions of the next physical iteration become idle. The idle status is proper because the instructions are already executed. In this manner, the array prefetch handling is repeated precisely from the point the procedure became idle.

Referring to FIG. 8 in conjunction with FIG. 7, a timing diagram illustrates an example of the timing of array prefetch data transfers under control of the array prefetch control circuit 810. In this example, a program code implements a floating point loop calculation expressed as follows:

for (i=0; i<4; i++)
      c[i]=a[i] * b[i].

For simplicity of explanation, the program code is assumed to execute on a sequential computer with a single AAU and, therefore, one array prefetch buffer (APB) channel and all loop service operations are disregarded. The computer has an APMV latency of one cycle and an FMUL latency of four cycles. The loop is compiled into a two-staged pipelined loop, described as follows:

LOAD ai
   LOAD bi
   FMUL
   STORE c(i-1).

Due to latencies arising due to the memory subsystem organization, the location of data either in a secondary cache or main memory, the dynamic condition of the memory subsystem relating to conflicts between different requests which simultaneously access the same memory module, data elements a0, a1, a2 and a3 data are each read in six cycles. Data elements b0, b1 and b3 are read in seven cycles. Data element b2 is read in ten cycles.

FIG. 8 shows cycle-by-cycle all states and events. Logical iterations are represented by vertical columns with operations executing at appropriate times. Physical iterations are represented as groups of horizontal rows indicating instructions in the loop body. A frame is a collection of instructions of the loop body in the APB corresponding to the same physical iteration. The number of frames which are currently held in the APB is stored in the loop state register LSR1 in a frame count field (denoted cldovl). The frame count field is updated at the end of a physical iteration in the manner of other loop status registers. The frame count field is incremented if a frame has been added to the APQ tail. . The frame count field is decremented if a frame has been drawn off the APQ head, a condition which occurs, for example, when a static stage is enabled by the apb_ready predicate.

Frames are allotted for each initial, or static, physical iteration. The number of physical iterations (NPI) is described according to the following equations:

$$NPI=NLI+(NOVL-1)$$

or $$NPI=LPR1c+LPR.novl$$

or $$NPI=LSPLclc+LSRLecnt.$$

During loops in which the array prefetch method is activated, the condition of loop termination includes two components, termination for a dynamic loop portion and termination for a static loop portion. Dynamic loop portion termination is indicated by termination of the array prefetch buffer frame count (cldovl). Static loop portion termination is indicated by simultaneous termination of the loop counter (clc) and the epilogue counter (ecnt).

During initialization, the apb_ready predicate is set, the tail pointer (tptr) is reset, the head pointer (hptr) is reset, and the APQ head instruction number register (hins) is reset. The loop counter (clc) is set to four. The epilogue counter (ecnt) is set to 1 indicating a two stage static schedule. The APB frame count (cldovi) is reset. A shift count is set to two, for example (1<<(NOVL−1)). Three pairs of address registers are used and initially loaded with addresses a0, b0 and c0, respectively.

Upon entering a loop body, the loop mode flag (1 m) is set and the current instruction number register (cins) is reset. The physical iterations (PI) are enumerated from 1 to 8, for example. The cycle number is indicated by the current instruction number (cins) value. The logical iterations (LI) are enumerated from 0 to 3.

Referring to physical iteration 1 (PI1), cycle 0, a load operation is interpreted as combined APLD and APMV operations. The APLD operation is issued with the tail pointer (tptr) value (APB[0]) set as the destination register attribute. Array prefetch buffer entry APB[0] is invalidated and APBV[0] is reset. The address of the "a" array is advanced. The APMV operation is disabled by the apb_ready predicate because the APQ head contains no data to move, a condition indicated by the equivalence of the head pointer (hptr) to the tail pointer (tptr). The APQ head becomes fixed until the same instruction of the next physical iteration (PI). The current instruction number register (cins) and the tail pointer (tptr) are advanced.

Referring to physical iteration 1 (PI1), cycle 1, the load operation is interpreted as combined APLD and APMV operations. The APLD operation is issued with a tail pointer (tptr) value (APB[1]) set as the destination register attribute. Array prefetch buffer entry APB[1] is invalidated and APBV[1] is reset. The address of the "b" array is advanced. The APMV operation is disabled by the apb_ready predicate because the APQ head is fixed due to the equivalence of the current instruction number register (cins) and the head instruction number register (hins). The current instruction number register (cins) and the tail pointer (tptr) are advanced.

Referring to physical iteration 1 (PI1), cycle 2, a FMUL operation is disabled by the apb_ready predicate because the APQ head is fixed due to the equivalence of the current instruction number register (cins) and the head instruction number register (hins).

Array prefetch buffer entry APB[2] is allotted for this instruction and APBV[2] is set because no data were requested from memory. The current instruction number register (cins) and the tail pointer (tptr) are advanced.

Referring to physical iteration 1 (PI1), cycle 3, a STORE operation is disabled for two reasons. First the side-effects enabled predicate (ls_se_enbl) is true. Second, the array prefetch buffer apb_ready predicate is false because the APQ head is fixed due to the equivalence of the current instruction number register (cins) and the head instruction number register (hins). Array prefetch buffer entry APB[3] is allotted for this instruction, and APBV[3] is set because no data were requested from memory. Physical iteration 1 (PI1), cycle 3 is the last instruction of a stage and, as such, advances the loop stage context and transfers control to the beginning of the loop body. The loop counter (clc) is decremented. The frame count field (cldovl) is incremented.

The tail pointer (tptr) is advanced. The current instruction number register (cins) is reset. Context items related to the static part of the loop iterations are preserved because the APQ head is fixed. The context items include a shift register (sh) and rotation of the register and predicate files.

Referring to physical iteration 2 (PI2), cycle 0, the load operation is interpreted as combined APLD and APMV operations. The APLD operation is issued with a tail pointer (tptr) value (APB[4]) as destination register attribute. Array prefetch buffer entry APB[4] is invalidated and APBV[4] is reset. The address of the "a" array is advanced.

APQ head is no longer fixed since the head instruction number register (hins) is equal to the current instruction number register (cins) but the APQ head is not ready because APBV[0] is equal to 0. Accordingly, the APMV is disabled. APQ head again becomes fixed and remains fixed until the same instruction of the next physical iteration (PI).

The current instruction number register (cins) and the tail pointer (tptr) are advanced.

Referring to physical iteration 2 (PI2), cycle 1, the load operation is interpreted as combined APLD and APMV operations. The APLD operation is issued, having a tail pointer (tptr) value (APB[5]) as a destination register attribute. Array prefetch buffer entry APB[5] is invalidated and APBV[5] is reset. The address of the "b" array is advanced. The APMV operation is disabled by the apb_ready predicate because APQ head is fixed with the head instruction number register (hins) not equal to the current instruction number register (cins). The current instruction number register (cins) and the tail pointer (tptr) are advanced.

Referring to physical iteration 2 (PI2), cycle 2, the a0 element is retrieved from memory and written to APB[0]. APBV[0] is set. The FMUL operation is disabled by the apb_ready predicate because APQ head is fixed (hins=cinc). Array prefetch buffer entry APB[6] is allotted for this instruction, and APBV[6] is set because no data were requested from memory. The current instruction number register (cins) and the tail pointer (tptr) are advanced.

Referring to physical iteration 2 (PI2), cycle 3, the STORE operation is disabled for two reasons. First the side-effects enabled predicate (ls_se_enbl) is true. Second, the array prefetch buffer apb_ready predicate is false because the APQ head is fixed due to the equivalence of the current instruction number register (cins) and the head instruction number register (hins). Array prefetch buffer entry APB[7] is allotted for this instruction, and APBV[7] is set because no data were requested from memory. Physical iteration 2 (PI2), cycle 3 is the last instruction of a stage advances the loop stage context and transfers control to the beginning of the loop body. The loop counter (clc) is decremented. The frame count field (cldovl) is incremented. The pointer (tptr) is advanced. The current instruction number register (cins) is reset. Context items related to the static portion of the loop iterations are preserved because the APQ head is fixed. The context items include the shift register (sh) and the rotation of the register and predicate files.

Referring to physical iteration 3 (PI3), cycle 0, the b0 element is retrieved from memory and written to Array prefetch buffer entry APB[1]. APBV[1] is set. The load operation is interpreted as combined APLD and APMV operations. The APLD operation is issued, having a tail pointer (tptr) value (APB[8]) as destination register attribute. Array prefetch buffer entry APB[8] is invalidated and APBV[8] is reset. The address of the "a" array is advanced. The APQ head is no longer fixed (hins==cins) and ready because APBV[0] is 1. The first static stage of the first logical iteration begins execution. The APMV operation moves a0 from Array prefetch buffer entry APB[0] to a working register designated by the destination opcode attribute of the initial LOAD operation. Note that, while APQ head was not ready, the working register context was preserved, and now corresponds to the first static physical iteration (PI) of the static schedule. The head instruction number register (hins) and the head pointer (hptr) are advanced. The current instruction number register (cins) and the tail pointer (tptr)are advanced.

Referring to physical iteration 3 (PI3), cycle 1, the load operation is interpreted as combined APLD and APMV operations. The APLD operation is issued, having a tail pointer (tptr) value (APB[9]) as destination register attribute. Array prefetch buffer entry APB[9] is invalidated and APBV[9] is reset. The address of the "b" array is advanced. APQ head is no longer fixed (hins==cins) and ready because APBV[1] is 1. The APMV operation moves b0 from Array prefetch buffer entry APB[1] to working register designated by the destination opcode attribute of initial LOAD operation. The head instruction number register (hins) and the head pointer (hptr) are advanced. The current instruction number register (cins) and the tail pointer (tptr)are advanced.

Referring to physical iteration 3 (PI3), cycle 2, the a0 element is retrieved from memory and written to Array prefetch buffer entry APB[4]. APBV[4] is set. The FMUL operation is executed over a0 and b0 values. Array prefetch buffer entry APB[10] is allotted for this instruction, and APBV[10] is set because no data were requested from memory. APQ head is no longer fixed (bins==cins) and ready because APBV[2] is 1. The head instruction number register (hins) and the head pointer (hptr) are advanced. The current instruction number register (cins) and the tail pointer (tptr)are advanced.

Referring to physical iteration 3 (PI3), cycle 3, the STORE operation is disabled because the side-effects enabled predicate (ls_se_enbl) is true since the STORE operation is scheduled for the second static stage. Array prefetch buffer entry APB[11] is allotted for this instruction and APBV[11] is set because no data were requested from memory. APQ head is no longer fixed (bins==cins) and ready because APBV[3] is 1. Physical iteration 3 (PI3), cycle 3 is the last instruction of a stage and, as such advances loop stage context and transfers control back to beginning of loop body. The loop counter (clc) is decremented. The frame count field (cldovl) is simultaneously incremented and decremented, keeping a value of 2. The tail pointer (tptr) is advanced. The current instruction number register (cins) is reset. The shift register (sh) is shifted right. Register and predicate files are rotated.

Physical iteration 4 (PI4) is the second static stage of the logical iteration 0 (LI0) and the first static stage of logical iteration 1 (LI1) and proceeds concurrently with dynamic stages of the third and fourth logical iterations. Physical iteration 4 (PI4) cycles 0, 1 and 2 are analogous to physical iteration 3 (PI3) cycles 0, 1and 2.

Referring to physical iteration 4 (PI4), cycle 3, the STORE operation c0 is executed. The address of the "c" array is advanced. Array prefetch buffer entry APB[15] is allotted for this instruction and APBV[15] is set because no data were requested from memory.

APQ head is no longer fixed (hins==cins) and ready because APBV[7] is 1. Physical iteration 4 (PI4), cycle 3 is the last instruction of a stage and therefore advances the loop stage context and transfers control to the beginning of the loop body. The loop counter (clc) is decremented, thus terminating the kernel so that the epilogue stage begins. The frame count field (cldovl) is simultaneously incremented and decremented, keeping a value of 2. The tail pointer (tptr) is advanced. The current instruction number register (cins) is reset. Shift register (sh) is shifted right and the register and predicate files are rotated.

Referring to physical iteration 5 (PI5), cycle 0, the load operation is interpreted as combined APLD and APMV operations. The APLD operation is disabled because of th setting of the Is_ld_embl predicate. Array prefetch buffer entry APB[16] is allotted for this instruction and APBV[16] is set because no data were requested from memory. APQ head is no longer fixed (hins==cins) and becomes ready because APBV[8] is 1. The APMV operation moves a2 from Array prefetch buffer entry APB[8] to working register designated by the destination opcode attribute of initial LOAD operation. The head instruction number register (hins) and the head pointer (hptr) are advanced. The current instruction number register (cins) and the tail pointer (tptr) are advanced.

Referring to physical iteration 5 (PI5), cycle 1, the load operation is interpreted as combined APLD and APMV operations. The APLD operation is disabled by the setting of the Is_d_enbl predicate. Array prefetch buffer entry APB [17] is allotted for this instruction and APBV[17] is set because no data were requested from memory. The APQ head is no longer fixed (hins==cins) but not ready because APBV[9] is 0. The APMV operation is disabled. One more additional stage of the logical iteration 2 (LI2) begins. An additional stage be inserted which does not necessarily start from the beginning of a physical iteration (PI) but endures for an entire physical iteration. The current instruction number register (cins) and the tail pointer (tptr)are advanced.

Referring to physical iteration 5 (PI5), cycle 2, an a3 element is retrieved from memory and written to Array prefetch buffer entry APB[12]. APBV[12] is set. The FMUL operation is disabled because APQ head is fixed. Array prefetch buffer entry APB[18] is allotted for this instruction, and APBV[18] is set because no data were requested from memory. The current instruction number register (cins) and the tail pointer (tptr)are advanced.

Referring to physical iteration 5 (PI5), cycle 3, a b2 element is retrieved from memory and written to Array prefetch buffer entry APB[9]. APBV[9] is set. The STORE operation is disabled because APQ head is fixed. Although the STORE operation is created in logical iteration 1 (LI1) and the additional stage is caused by logical iteration 2 (LI2), the STORE operation remains disabled. At run-time, the logical iteration to which the STORE operation belongs is unknown. Array prefetch buffer entry APB[19] is allotted for the STORE instruction and APBV[19] is set because no data were requested from memory. Physical iteration 5 (PI5), cycle 3 includes the last instruction of a stage and therefore advances the loop stage context and transfers control back to beginning of loop body. The loop counter (clc) remains at a 0 count. The epilogue counter (ecnt) is decremented. The frame count field (cldovl) is incremented. The tail pointer (tptr) is advanced. The current instruction number register (cins) is reset. The static loop context is fixed.

Referring to physical iteration 6 (PI6), cycle 0, a b3 element is retrieved from memory and written to Array prefetch buffer entry APB[13]. APBV[13] is set. The load operation is interpreted as combined APLD and APMV operations. The APLD operation is disabled by the setting of the Is_ld_enbl predicate. The APQ head is fixed. The APMV operation is disabled. The current instruction number register (cins) is advanced. The tail pointer (tptr) is not used further for tracking entries in the array prefetch queue and is therefore held unchanged.

Referring to physical iteration 6 (PI6), cycle 1, the load operation is interpreted as combined APLD and APMV operations. The APLD operation is disabled by the setting of the Is_ld_enbl predicate. APQ head is no longer fixed (hins==cins) and is ready because APBV[9] is 1. The APMV operation is executed. The current instruction number register (cins) is advanced.

Referring to physical iteration 6 (PI6), cycle 2, the APQ head is no longer fixed (hins==cins) and is ready because APBV[11] is 1. The FMUL operation is executed. The current instruction number register (cins) is advanced.

Referring to physical iteration 6 (PI6), cycle 3, the APQ head is no longer fixed (hins==cins) and is ready because APBV[11] is 1. The STORE operation c1 is executed. Physical iteration 6 (PI6), cycle 3, includes the last instruction of a stage and therefore advances the loop stage context and transfers control to the beginning of the loop body. The loop counter (cic) remains at a 0 count. The epilogue counter (ecnt) remains at a count of 0. The frame count field (cldovl) is decremented. The current instruction number register (cins) is reset. The statical loop context is advanced.

Referring to physical iteration 7 (PI7), cycle 0, the load operation is interpreted as combined APLD and APMV operations. The APLD operation is disabled by the setting of the Is_ld_embl predicate. The APQ head is no longer fixed (hins==cins) and is ready because APBV[12] is 1. The APMV operation is executed. The current instruction number register (cins) is advanced.

Referring to physical iteration 7 (PI7), cycle 1, the load operation is interpreted as combined APLD and APMV operations. The APLD operation is disabled by the setting of the Is_Id_enbl predicate. The APQ head is no longer fixed (hins==cins) and is ready because APBV[13] is 1. The APMV operation is executed. The current instruction number register (cins) is advanced.

Referring to physical iteration 7 (PI7), cycle 2, APQ head is no longer fixed (hins==cins) and ready because APBV[14] is 1. The FMUL operation is executed. The current instruction number register (cins) is executed.

Referring to physical iteration 7 (PI7), cycle 3, the APQ head is no longer fixed (hins==cins) and is ready because APBV[15] is 1. The STORE operation c2 is executed. Physical iteration 7 (PI7), cycle 3 includes the last instruction of a stage and therefore advances the loop stage context and transfers control to the beginning of the loop body. The loop counter (clc) remains at a 0 count. The epilogue counter (ecnt) remains at a count of 0. The frame count field (cldovl) is decremented, The current instruction number register (cins) is reset. The static loop context is advanced.

Referring to physical iteration 8 (PI8), cycle 0, the load operation is interpreted as combined APLD and APMV operations. The APLD operation is disabled because of the setting of the Is_Id_embl predicate. The APQ head is no longer fixed (hins==cins) and is ready because APBV[16] is 1. The APMV operation is executed (not shown) and moves garbage data generated by the superfluous logical iteration 4 (LI4). The current instruction number register (cins) is advanced.

Referring to physical iteration 8 (Pl8), cycle 1, the load operation is interpreted as combined APLD and APMV operations. The APLD operation is disabled because of the setting of the Is_ld_embl predicate. APQ head is no longer fixed (hins==cins) and is ready because APBV[17] is 1. The APMV operation is executed (not shown) and moves garbage data of superfluous logical iteration 4 (LI4). The current instruction number register (cins) is advanced.

Referring to physical iteration 8 (PI8), cycle 2, the APQ head is no longer fixed (hins==cins) and is ready because APBV[18] is 1. The FMUL operation is executed (not shown) and processes garbage data of superfluous logical iteration 4 (LI4). The current instruction number register (cins) is advanced.

Referring to physical iteration 8 (PI8), cycle 3: the APQ head is no longer fixed (hins==cins) and is ready because APBV[19] is 1. The STORE operation c3 is executed. A branch unit detects the condition that the loop is terminating and encodes "fall through" control transfer, thus exiting the loop body.

While the invention has been described with reference to various embodiments, it will be understood that these embodiments are illustrative and that the scope of the invention is not limited to them. Many variations, modifications, additions and improvements of the embodiments described are possible.

CROSS-REFERENCE

The present invention is related to subject matter disclosed in the following co-pending patent applications:

1. United States patent application entitled "Apparatus and Methods for Execution of Computer Instructions", serial no. XX/xxx,xxx<atty. docket no.: M-3492 US>, and the corresponding PCT international application designating the United States of America (Ser. No. PCT/RU96/00210);

2. United States patent application entitled "Disambiguation Memory Circuit and Operating Method", serial no. XX/xxx,xxx<atty. docket no.: M-3728 US>, naming Babaian et al. as inventors and filed on even date herewith, and the corresponding PCT international application designating the United States of America (Ser. No. PCT/RU96/00215);

3. United States patent application entitled, "Architectural Support for Software Pipelining of Loops", serial no. XX/xxx,xxx<atty. docket no.: M-3730 US>, naming Babaian et al. as inventors and filed on even date herewith, and the corresponding PCT international application designating the United States of America (Ser. No. PCT/RU96/00213);

4. United States patent application entitled "Multifunctional Execution Unit, Executing Combined Operations and Supporting Continuing Instruction Flow," serial no. XX/xxx,xxx<atty. docket no.: M-3731 US>, naming Gorshtein et al. as inventors and filed on even date herewith, and the corresponding PCT international application designating the United States of America (Ser. No. PCT/RU96/00214);

5. United States patent application entitled, "Architectural Support for Software Pipelining of Nested Loops," serial no. XX/xxx,xxx<atty. docket no.: M-3794 US>, naming Babaian et al. as inventors and filed on even date herewith, and the corresponding PCT international application designating the United States of America (Ser. No. PCT/RU96/002 16); and 6. United States patent application entitled, "Wide Instruction Unpack," serial no. XX/xxx,xxx<atty. docket no.: M-3795 US>, naming Sakhin et al. as inventors and filed on even date herewith, and the corresponding PCT international application designating the United States of America (Ser. No. PCT/RU96/00218);

each of which is incorporated herein by reference, in its entirety.

What is claimed is:

1. A processor including an array prefetch apparatus for transferring array data from a memory to an execution unit in the processor, the array prefetch apparatus comprising:

an array prefetch queue pointer coupled to the memory for receiving array data;

a first array prefetch queue pointer coupled to the array prefetch queue for designating in the array prefetch queue a location for loading the array data;

a second array prefetch queue pointer coupled to the array prefetch queue for designating in the array prefetch queue a location for accessing the array data; and an array prefetch controller coupled to the array prefetch queue and the first and second array prefetch queue pointers, the array prefetch controller for executing a load operation as an array load operation and an array move operation, the array load operation for accessing the array data from the memory and transferring the array data to the array prefetch queue at the location designated by the first pointer, the array move operation for moving the array data from the array prefetch queue at the location designated by the second pointer for accessing by the execution unit of the processors; and a loop control logic supporting software pipelining of loops, the loop control logic for executing a plurality of stages (S) in a compiled, pipelined loop schedule of T cycles having the iteration interval I, in which the loop control dynamically controls the number of stages in an iteration as a function of the latencies of memory read operations.

2. A processor according to claim 1 wherein the array load operation and the array move operation are executed independently and asynchronously.

3. A processor according to claim 1 further comprising:

an array prefetch flag register coupled to the array prefetch controller, the array prefetch flag selectively directing the array prefetch controller to execute the load operation as the array load operation and the array move operation for a first array prefetch flag register setting and to execute the load operation as a load operation for a second array prefetch flag register setting.

4. A processor according to claim 1 wherein the array load operation inherits attributes of the load operation that concern issuing of a memory request and advancing of a memory address and wherein the array move operation inherits attributes of the load operation that concern loading of a destination register by a read data.

5. A processor according to claim 1, wherein the array prefetch queue further comprises:

an array prefetch queue data memory; and an array prefetch queue for valid bits.

6. A processor according to claim 1, further comprising:

plurality of array access channels, wherein the array prefetch queue further comprises:

an array prefetch queue data memory including a plurality of channels, the channels of the array prefetch data memory corresponding one-to-one to the array access channels; and an array prefetch queue for valid bits including a plurality of channels, the channels of the array prefetch queue for valid bits corresponding one-to-one to the array access channels.

7. A method of transferring array data from a memory to a register during run-time of a compiled and compacted loop program comprising the steps of:

designating in an array prefetch queue a location for loading array data;

designating in the array prefetch queue a location for accessing the array data and moving the array data to a register;

executing a load operation as a combination of an array load operation and an array move operation;

for the array load operation, accessing the array data from the memory and transferring the array data to the array prefetch queue at the location for loading array data;

for the array move operation, moving the array data from the array prefetch queue at the location designated by the second pointer to a register designated by the array move operation.

8. A method according to claim 7 further comprising:

executing a load operation as a combination of an array load operation and an array move operation for a first setting of an array prefetch flag; and alternatively executing a load operation as a load operation for a second setting of an array prefetch flag.

9. A method according to claim 7 wherein the array load operation and the array move operation are executed independently and asynchronously.

10. A method according to claim 7, wherein the array load operation inherits attributes of the load operation that concern issuing of a memory request and advancing of a memory address and wherein the array move operation inherits attributes of the load operation that concern loading of a destination register by a read data.

11. A method of providing a processor including an array prefetch apparatus for transferring array data from a memory to a register, the array prefetch apparatus comprising the steps of:

providing an array prefetch queue coupled to the memory for receiving the array data;

providing an array prefetch queue tail pointer coupled to the array prefetch queue for designating in the array prefetch queue a location for loading the array data;

providing an array prefetch queue head pointer coupled to the array prefetch queue for designating in the array prefetch queue a location for accessing the array data and moving the array data to a register;

providing an array prefetch flag;

providing an array prefetch controller coupled to the array prefetch queue, the array prefetch flag and the first and second array prefetch queue pointers, the array prefetch controller for executing a load operation as a load operation for a first setting of the array prefetch flag and alternatively, for a second setting of the array prefetch flag, executing a load operation as a combination of an array load operation and an array move operation, the array load operation for accessing the array data from the memory and transferring the array data to the array prefetch queue at the location designated by the array prefetch queue tail pointer, the array move operation for moving the array data from the array prefetch queue at the location designated by the array prefetch head pointer to a register designated by the array move operation.

12. A method according to claim 11, wherein the array load operation inherits attributes of the load operation that concern issuing of a memory request and advancing of a memory address and wherein the array move operation inherits attributes of the load operation that concern loading of a destination register by a read data.

13. A method according to claim 11, wherein the array load operation and the array move operation are executed independently and asynchronously.

14. A method according to claim 11 wherein array data is transferred from a memory to a register during run-time of a compiled and compacted loop operation.

15. A processor including an array prefetch apparatus for transferring array data from a memory to a register, the array prefetch apparatus comprising:

an array prefetch queue coupled to the memory for receiving the array data;

an array prefetch queue tail pointer coupled to the array prefetch queue for designating in the array prefetch queue a location for loading the array data;

an array prefetch queue head pointer coupled to the array prefetch queue for designating in the array prefetch queue a location for accessing the array data and moving the array data to a register;

an array prefetch flag;

an array prefetch controller coupled to the array prefetch queue, the array prefetch flag and the first and second array prefetch queue pointers, the array prefetch controller for executing a load operation as a load operation for a first setting of the array prefetch flag and alternatively, for a second setting of the array prefetch flag, executing a load operation as a combination of an array load operation and an array move operation, the array load operation for accessing the array data from the memory and transferring the array data to the array prefetch queue at the location designated by the array prefetch queue tail pointer, the array move operation for moving the array data from the array prefetch queue at the location designated by the array prefetch head pointer to a register designated by the array move operation.

16. A processor according to claim 15, wherein the array load operation inherits attributes of the load operation that concern issuing of a memory request and advancing of a memory address and wherein the array move operation inherits attributes of the load operation that concern loading of a destination register by a read data.

17. A processor according to claim 15 wherein the array load operation and the array move operation are executed independently and asynchronously.

18. A processor including an array prefetch apparatus for transferring array data from a memory to an execution unit in the processor, the array prefetch apparatus comprising:

an array prefetch queue coupled to the memory for receiving array data;

a first array prefetch queue pointer coupled to the array prefetch for designating in the array prefetch queue a location for loading the array data;

a second array prefetch queue pointer coupled to the array prefetch queue for designating in the array prefetch queue a location for accessing the array data; and an array prefetch controller coupled to the array prefetch queue and the first and second array prefetch queue pointers, the array prefetch controller for executing a load operation as an array load operation and an array move operation, the array load operation for accessing the array data from the memory and transferring the array data to the array prefetch queue at the location designated by the first pointer, the array move operation for moving the array data from the array prefetch queue at the location designated by the second pointer for accessing by the execution units of the processor; and a loop control logic supporting software pipelining of loops in a horizontal processor, the loop control logic including:

a loop mode flag indicative of a current loop mode status, the loop mode flag being set when a loop is executed;

a loop counter indicative of a first remaining number of logical iterations in the loop being executed;

a prologue counter indicative of a second remaining number of logical iterations in a prologue portion of the loop being executed; and first enabling/disabling logic coupled to the loop mode flag and to the prologue counter, the first enabling/disabling logic disabling execution of operations in a first class of operations having side effects.

19. A processor including an array prefetch apparatus for transferring array data from a memory to a register, the array prefetch apparatus comprising:

an array prefetch queue coupled to the memory for receiving the array data;

an array prefetch queue tail pointer coupled to the array prefetch queue for designating in the array prefetch queue a location for loading the array data;

an array prefetch queue head pointer coupled to the array prefetch queue for designating in the array prefetch queue a location for accessing the array data and moving the array data to a register;

an array prefetch flag;

an array prefetch controller coupled to the array prefetch queue, the array prefetch flag and the first and second array prefetch queue pointers, the array prefetch controller for executing a load operation as a load operation for a first setting of the array prefetch flag and alternatively, for a second setting of the array prefetch flag, executing a load operation as a combination of an array load operation and an array move operation, the array load operation for accessing the array data from the memory and transferring the array data to the array prefetch queue tail pointer, the array move operation for moving the array data from the array prefetch queue at the location designated by the array prefetch head pointer to a register designated by the array move operation; and a loop control logic supporting software pipelining of loops, the loop control logic for executing a plurality of stages (S) in a compiled, pipelined loop schedule of T cycles having an iteration interval I, in which the loop control logic dynamically controls the number of stages in an iteration as a function of the latencies of memory read operations.

20. A processor including an array prefetch apparatus for transferring array data from a memory to a register, the array prefetch apparatus comprising:

an array prefetch queue coupled to the memory for receiving the array data;

an array prefetch queue tail pointer coupled to the array prefetch queue for designating in the array prefetch queue a location for loading the array data;

an array prefetch queue head pointer coupled to the array prefetch queue for designating in the array prefetch queue a location for accessing the array data and moving the array data to a register;

an array prefetch flag;

an array prefetch controller coupled to the array prefetch queue, the array prefetch flag and the first and second array prefetch queue pointers, the array prefetch controller for executing a load operation as a load operation for a first setting of the array prefetch flag and alternatively, for a second setting of the array prefetch flag, executing a load operation as a combination of an array load operation and an array move operation, the array load operation for accessing the array data from the memory and transferring the array data to the array prefetch queue at the location designated by the array prefetch queue tail pointer, the array move operation for moving the array data from the array prefetch queue at the location designated by the array prefetch head pointer to a register designated by the array move operation; and a loop control logic supporting software pipelining of loops in a horizontal processor, the loop control logic including:

a loop mode flag indicative of a current loop mode status, the loop mode flag being set when a loop is executed;

a loop counter indicative of a first remaining number of logical iterations in the loop being executed;

a prologue counter indicative of a second remaining number of physical iterations in a prologue portion of the loop being executed; and first enabling/disabling logic coupled to the loop mode flag and to the prologue counter, the first enabling/disabling logic disabling execution of operations in a first class of operations having side effects.

* * * * *